(12) United States Patent
Lanningham et al.

(10) Patent No.: US 11,157,341 B1
(45) Date of Patent: Oct. 26, 2021

(54) DATA CONTRACTS

(71) Applicant: ADP, LLC, Roseland, NJ (US)

(72) Inventors: Pi Lanningham, New York, NY (US);
John Benlin Lee, New York, NY (US);
Nicholas Ford, New York, NY (US);
Richard Noad, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/918,814

(22) Filed: Jul. 1, 2020

(51) Int. Cl.
*G06F 9/54* (2006.01)
*G06Q 10/06* (2012.01)

(52) U.S. Cl.
CPC ........... *G06F 9/547* (2013.01); *G06Q 10/067* (2013.01)

(58) Field of Classification Search
CPC .............................. G06F 9/547; G06Q 10/067
See application file for complete search history.

(56) References Cited

U.S. PATENT DOCUMENTS

| | | | |
|---|---|---|---|
| 7,574,516 B2 | 8/2009 | Srinivasan et al. | |
| 7,730,041 B2 | 6/2010 | Purdy et al. | |
| 8,422,514 B1* | 4/2013 | Kothari | H04L 12/4633 370/466 |
| 8,862,984 B1 | 10/2014 | Thakare et al. | |
| 2009/0254670 A1* | 10/2009 | Kim | H04L 67/2823 709/230 |
| 2013/0031143 A1 | 1/2013 | Katiyar et al. | |
| 2016/0308933 A1* | 10/2016 | Grant | H04L 67/2823 |
| 2018/0267781 A1 | 9/2018 | Schwab | |
| 2019/0362338 A1* | 11/2019 | Wang | G06Q 20/027 |
| 2020/0026785 A1* | 1/2020 | Patangia | H04L 63/123 |

OTHER PUBLICATIONS

Albahari, "Data Contract Serializer," copyright 2007-2017, 13 pages.
Next Turn et al., "Using Data Contracts," GitHub, Inc., dated Mar. 30, 2017, accessed Jun. 10, 2020. https://github.com/dotnet/docs/blob/master/docs/framework/wcf/feature-details/using-data-contracts.md.

* cited by examiner

*Primary Examiner* — Charles E Anya
(74) *Attorney, Agent, or Firm* — Yee & Associates, P.C.

(57) ABSTRACT

A method for facilitating communication between application components is provided. The method comprises invoking, by a data consumer, a data contract by requesting data, wherein the data contract specifies communication parameters between application components. The data contract identifies and invokes a provider component in response to the invocation by the data consumer. The provider translates input data from the data consumer to construct a producer request and sends the producer request to a data producer. The data producer sends output data to the provider in response to the producer request. The provider translates and sends the output data to the data contract, and the data contract send the translated output data to the data consumer.

17 Claims, 5 Drawing Sheets

DATA CONTRACTS

BACKGROUND INFORMATION

1. Field

The present disclosure relates generally to an improved computer system and, in particular, to a method of facilitating communication between software components that allows underlying application logic to change independently from input and output interfaces.

2. Background

The Lifion Development Platform (LDP) is a software development environment and runtime. The LDP development environment allows application developers to rapidly build software with very little code by connecting configurable components together. The LDP runtime translates application definitions written in the development environment into executing computer code.

Enabling LDP components to interact requires specifying and building a mechanism for identifying how data elements in one component's state should map to data elements in another component's interface (binding). Additionally, mechanisms need to be specified and built for interpreting those mappings and constructing appropriate calls and responses when an application is run.

SUMMARY

An illustrative embodiment provides a computer implemented method for facilitating communication between application components. The method comprises invoking, by a data consumer, a data contract by requesting data, wherein the data contract specifies communication parameters between application components. The data contract identifies and invokes a provider component in response to the invocation by the data consumer. The provider translates input data from the data consumer to construct a producer request and sends the producer request to a data producer. The data producer sends output data to the provider in response to the producer request. The provider translates and sends the output data to the data contract, and the data contract send the translated output data to the data consumer.

Another illustrative embodiment provides a system for facilitating communication between a plurality of application components. The system comprises a storage device configured to store program instructions and one or more processors operably connected to the storage device and configured to execute the program instructions to cause the system to: invoke, by a data consumer component, a data contract by requesting data, wherein the data contract specifies communication parameters between application components; identify, by the data contract, a provider component in response to the invocation by the data consumer component; invoke, by the data contract, the provider component; translate, by the provider component, input data from the data consumer to construct a producer request; send, by the provider component, the producer request to a data producer component; send, by the data producer component, output data to the provider component in response to the producer request; translate, by the provider component, the output data; send, by the provider component, the translated output data to the data contract; and send, by the data contract, the translated output data to the data consumer component.

Another illustrative embodiment provides a computer program product for facilitating communication between application components. The computer program product comprises a computer-readable storage medium having program instructions embodied thereon to perform the steps of: invoking, by a data consumer component, a data contract by requesting data, wherein the data contract specifies communication parameters between application components; identifying, by the data contract, a provider component in response to the invocation by the data consumer component; invoking, by the data contract, the provider component; translating, by the provider component, input data from the data consumer to construct a producer request; sending, by the provider component, the producer request to a data producer component; sending, by the data producer component, output data to the provider component in response to the producer request; translating, by the provider component, the output data; sending, by the provider component, the translated output data to the data contract; and sending, by the data contract, the translated output data to the data consumer component.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that enabling LDP components to interact requires binding between components as well as interpreting respective data element mappings and constructing calls and responses when an application is run.

The illustrative embodiments also recognize and take into account that because components bindings are specific to pairs for LDP components, it becomes costly to change the way an application is built on the LDP platform. If an application needs to change the way data is accessed or processed, the application developer must not only build new functionality but also change any affected bindings between components. Because component bindings are specific to pairs of LDP components, it is difficult to maintain a consistent design-time experience between pairs of bindings.

The illustrative embodiments provide data contracts, which allow developers to define interfaces between application components that hide implementation details. These interfaces allow components of an application (e.g., user interface (UI)) to invoke processes (e.g., data query or a data processing operation) without needing to be aware of how those processes are implemented. The hidden process can vary both in terms of the application logic being performed as well as the platform components used to perform that application logic.

Data contracts allow developers to evolve their application implementation over time while minimizing the impact of those evolutionary changes regardless of the nature of the changes to application logic or changes to the selection of platform components used to carry out that logic. By hiding the implementation and allowing that implementation to evolve or change independently of the more stable input/output interfaces, data contracts facilitate isolation of changes to application logic.

Some programming languages provide for isolation and abstraction through mechanisms such as object-orientation, interfaces, functions, and polymorphism. Such approaches achieve the effect of isolation via programming syntax. In contrast, data contracts of the illustrative embodiments achieve the effect of application modularity in a low-code and service-oriented/routing way.

Figure 1:
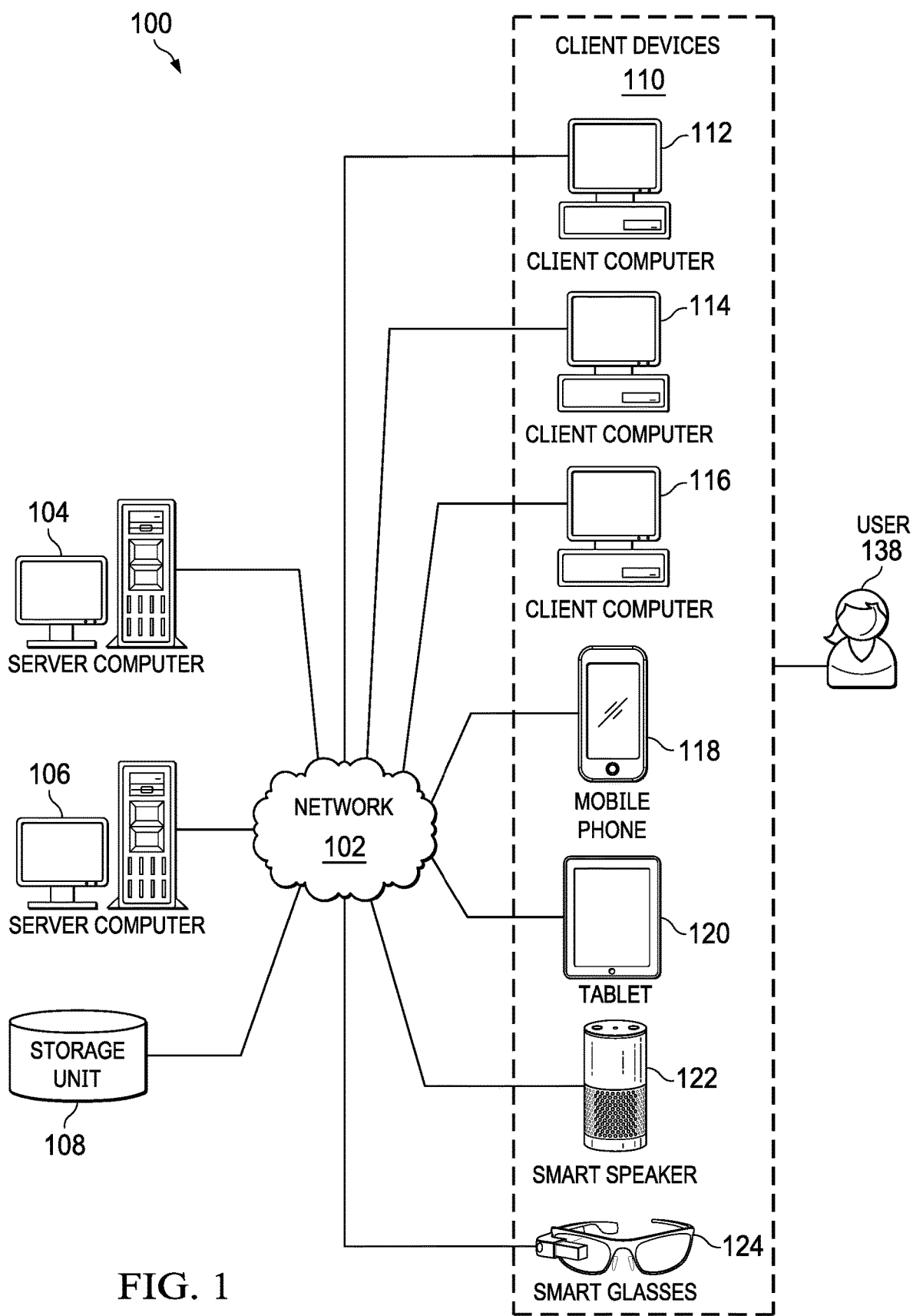
FIG. 1 is a block diagram of an information environment in accordance with an illustrative embodiment.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Further, client devices 110 can also include other types of client devices such mobile phone 118, tablet computer 120, smart speaker 122, and smart glasses 124. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

Figure 2:
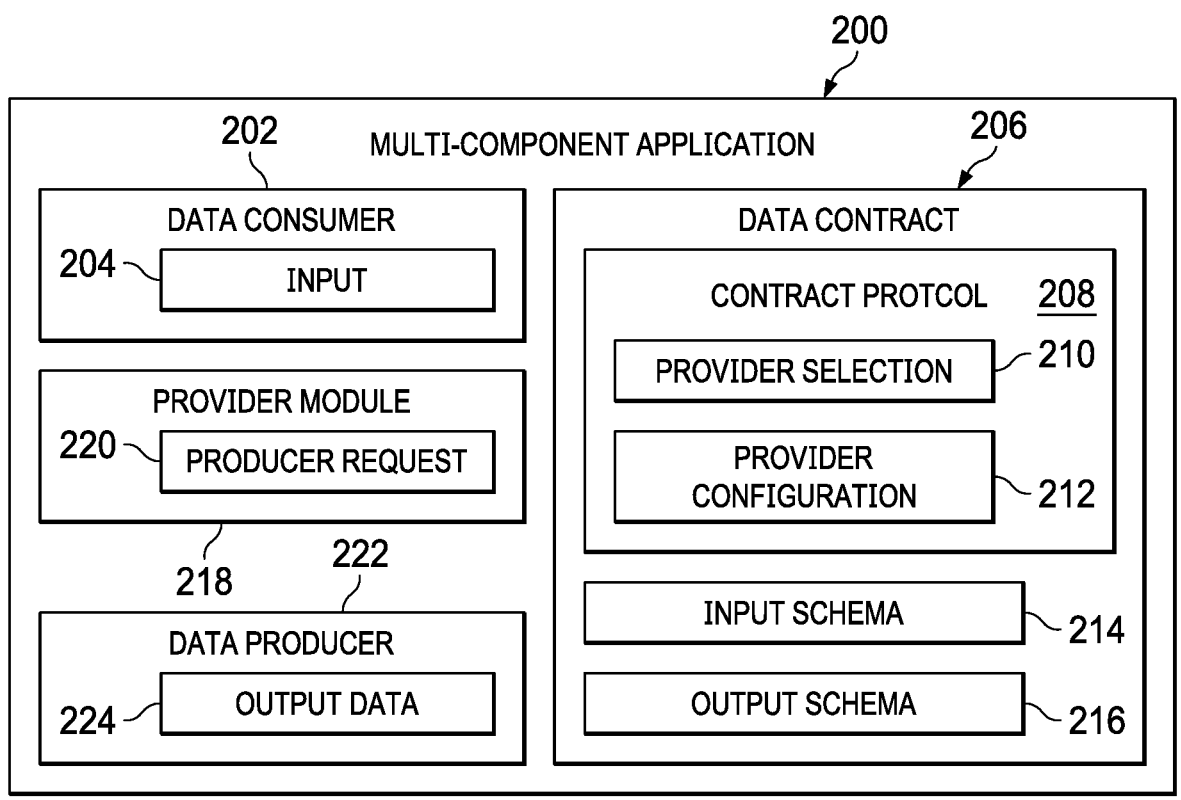
FIG. 2 is a block diagram of a multi-components application incorporating a data contract in accordance with an illustrative embodiment.

FIG. 2 is a block diagram of a multi-component application incorporating a data contract in accordance with an illustrative embodiment. Multi-component application 200 might be implemented in a computing environment such as network data processing system 100 and utilized by computing devices such as server computer 104 and 106 and client devices 110. In this altered example, multicomponent application 200 can be implemented as program code in which the instructions in the program code are executed by a number of processors in network data processing system 100. A processor is comprised of hardware circuits such as those on an integrated circuit that respond and process instructions and program code that operate a computer. When a number of processors execute instructions for a process, the number of processors is one or more processors can be on the same computer or on different computers in network data processing system 100. Further, when the number of processors on the same computer, the number processors can be on the same different on the same or different processor units in the computer. In other words, the process for multicomponent application 200 can be distributed between processors on the same or different computers in computer system 210.

Multi-component application 200 comprises data consumer 202, data contract 206, provider module 218, and data producer 224. Data consumer 202 invokes data contract 206 with input 204, which represents a request for data.

A data contract 206 comprises a contract protocol 208, an input schema 214, and an output schema 216. Contract protocol 208 is a pairing of a provider module selection 210 and a provider configuration 212 to use when invoking the provider module 218. The provider configuration 212 supplies information/options for the provider module 218 to generate the desired output. Protocol 208 determines how a contract invoked by data consumer 202 is fulfilled, i.e. how inputs 204 are consumed by the provider module 218 in order to generate output data 224 that follows the format of the contract output schema 216.

Provider module 218, identified by provider selection 210, is responsible for translating the combination of input data 204 and provider configuration 212 to generate a request 220 to a data producer 222.

Data producer 222 returns output data 224 in response to the contract invocation from data consumer 202. Data producer 222, in turn, may fulfill a contract invocation by generating output 224 using any mechanism available to it, without reference to data consumer 202, as long as the output is in a format the provider module 218 understands. Data consumer 202 is agnostic regarding the mechanism used to fulfill the data contract 206.

Multi-component application 200 can be implemented in software, hardware, firmware, or a combination thereof. When software is used, the operations performed by multi-component application 200 can be implemented in program code configured to run on hardware, such as a processor unit. When firmware is used, the operations performed by multi-component application 200 can be implemented in program code and data and stored in persistent memory to run on a processor unit. When hardware is employed, the hardware may include circuits that operate to perform the operations in multi-component application 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

LDP components that utilize data contracts to call other systems only need to interface with contracts, rather than every other contract-enabled system with which they need to interface.

The input schema is the expected format the data contract expects from a consumer. The output schema describes the expected format that the consumer can expect from the producer fulfilling a contract. The output schema defines the structure of the output. The structure might be a singular value (e.g., a number), a list of values or structures (e.g., a list of address structures), or a structure containing any combination of values, structures, and lists (e.g., a structure containing a number, a text field, or a structure containing an address).

Both input and output schema might be "local", "remote", or may be comprised of a combination of "local" and "remote" schema elements. A local schema is a format that is described purely within the context of a specific data contract and is not reused. A remote schema is a format that is described independently of a specific data contract and can be referenced or used within multiple data contracts or in other aspects of an application. Remote schema provides a facility for defining data formats once for reuse across a variety of scenarios.

Figure 3:
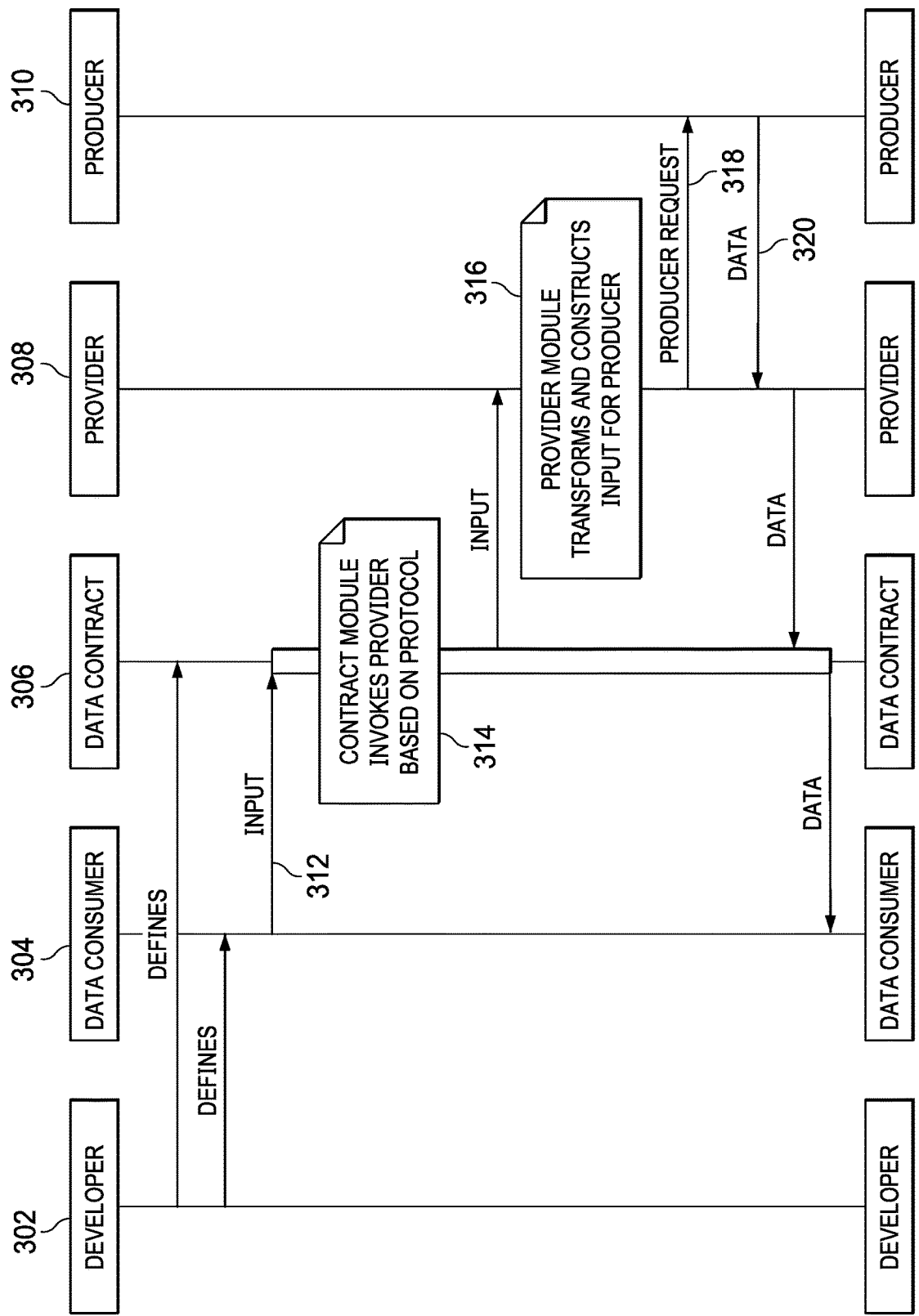
FIG. 3 depicts a unified modelling language sequence diagram illustrating the operation of the data contract in accordance with an illustrative embodiment.

FIG. 3 depicts a unified modelling language (UML) sequence diagram illustrating the operation of the data contract in accordance with an illustrative embodiment. The process in FIG. 3 can be implemented in hardware, software, or both. When implemented in software, the process can take the form of program code that is run by one of more processor units located in one or more hardware devices in one or more computer systems. UML sequence 300 might be implemented with multi-component application 200 shown in FIG. 2.

Sequence 300 begins with developer 302 defining a data consumer 304. A data consumer is any process that processes a user action. For example, a data consumer might be, e.g., a UI screen or application logic that processes a user action. Developer 302 also defines a data contract 306. Contract consumer 304 invokes data contract 306 by providing the correct input 312 to data contract 306 according to the input schema defined for data contract 306. An application programming interface (API) call is the mechanism by which the contract 306 is invoked. Schema examples include address (e.g., {line1: text, line2: text, city: text, state: picklist value, zip: text}) and list of associates (e.g., [{_id: identifier, name: text, age: number, hire date: date}]).

Data contract 306, based on its own protocol, identifies and invokes 314 the correct provider module 308. Provider 308 transforms and constructs 316 input 312 for producer 310 and sends producer request 318 to producer 310. The provider 308 is responsible for any translation between the producer format and the contract output schema. Examples of translation include, without limitation, transforming protocol buffers (Protobuf) to JavaScript Object Notation (JSON) and restructuring data to conform to the output schema (e.g., if the producer returns a list, and output is a single element, plucking the single element from the head of the list). Producer request 318 might be, e.g., HTTP, GraphQL, etc.

In response to producer request 318, producer 310 sends data 320 to provider 308. Provider 308 transforms data 320 and returns it to data contract 306. Data contract 306 forwards the data to contract consumer 304 according to the output schema defined for data contract 306.

Figure 4:
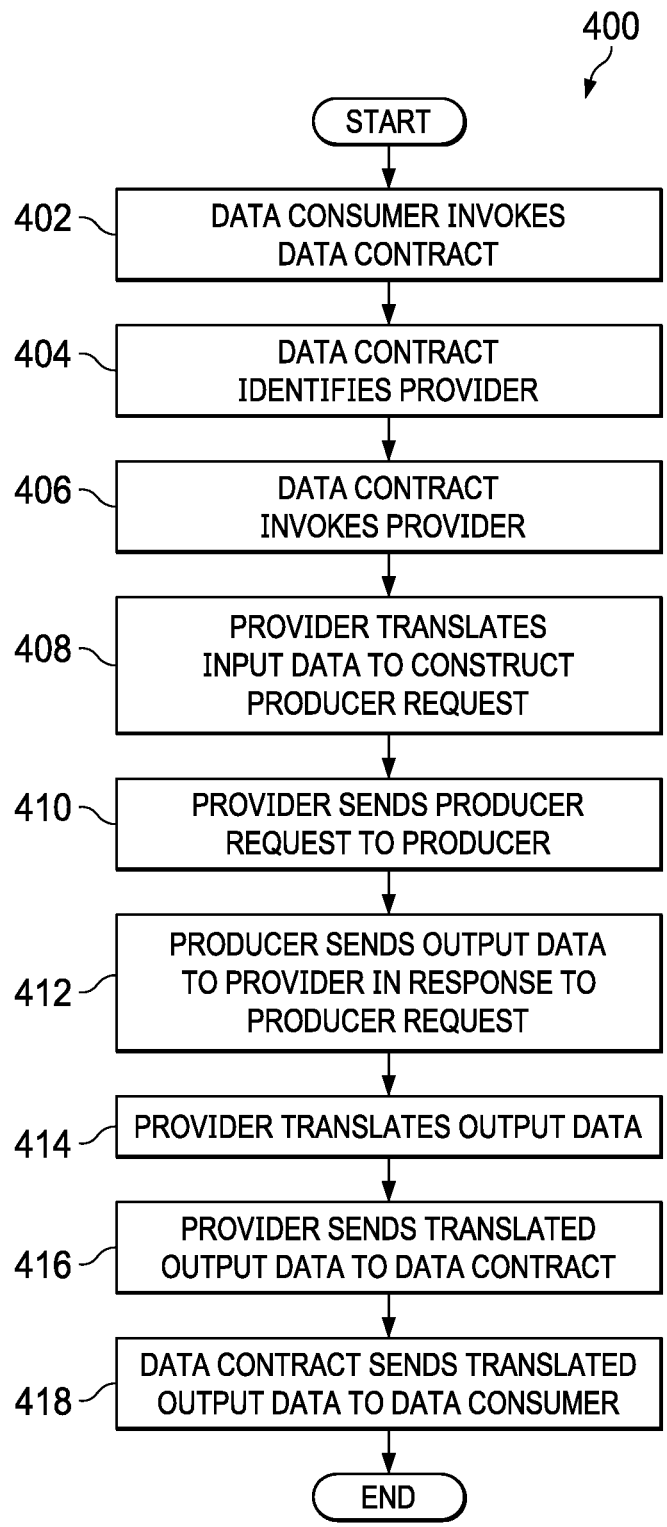
FIG. 4 depicts a flowchart illustrating a process of facilitating communication between application components in accordance with an illustrative embodiment.

FIG. 4 depicts a flowchart illustrating a process of facilitating communication between application components in accordance with an illustrative embodiment. The process in FIG. 4 can be implemented in hardware, software, or both. When implemented in software, the process can take the form of program code that is run by one of more processors located in one or more hardware devices in one or more computer systems. Process 400 might be implemented with multi-component application 200 shown in FIG. 2.

Process 400 begins by a data consumer invoking a data contract by requesting data, wherein the data contract specifies communication parameters between application components (step 402). The data consumer might invoke the data contract by sending input data to the data contract according to an input schema defined in the data contract. The input schema might be a local schema or remote schema.

The data contract identifies a provider component in response to the invocation by the data consumer component (step 404) and then invokes the provider component (step 406). The data contract might identify and invoke the provider according to a protocol that pairs the provider component with a defined configuration to use when invoking the provider.

The provider component translates input data from the data consumer to construct a producer request (step 408) and sends the producer request to a data producer component (step 410).

The producer sends output data to the provider component in response to the producer request (step 412). The data producer can fulfill the data contract in a manner selected by the data producer without need for reference to the data consumer component.

The provider then translates the output data (step 414). The provider component might translate the output data according to an output schema defined in the data contract. The output schema might be a local schema or a remote schema. The provider then sends the translated output data to the data contract (step 416).

The data contract sends the translated output data to the data consumer component (step 418). The process then ends.

Figure 5:
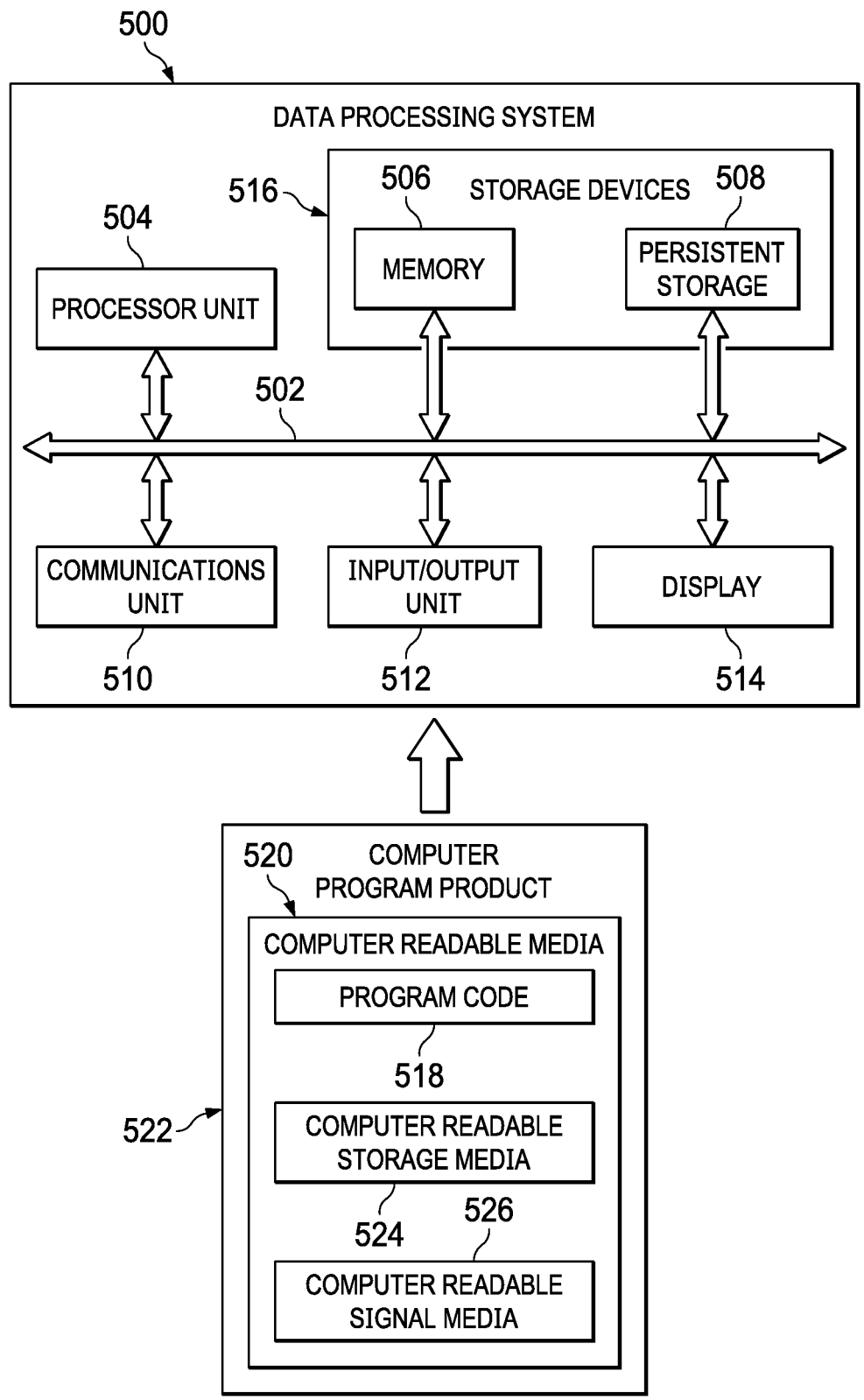
FIG. 5 is a block diagram of a data processing system in accordance with an illustrative embodiment.

Turning now to FIG. 5, an illustration of a block diagram of a data processing system is depicted in accordance with an illustrative embodiment. Data processing system 500 may be used to implement one or more of server computers 104, 106 and client computers 112, 114, 116, mobile phone 118, and table computer 120 in FIG. 1. In this illustrative example, data processing system 500 includes communications framework 502, which provides communications between processor unit 504, memory 506, persistent storage 508, communications unit 510, input/output unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation. In an embodiment, processor unit 504 comprises one or more conventional general purpose central processing units (CPUs). In an alternate embodiment, processor unit 504 comprises one or more graphical processing units (CPUs).

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 516, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508. Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518. Alternatively, program code 518 may be transferred to data processing system 500 using computer-readable signal media 526.

Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for facilitating communication between application components, the method comprising:
    using a number of processors to perform the steps of:
        invoking, by a data consumer component, a data contract by requesting data, wherein the data contract specifies communication parameters between application components and wherein the data contract identifies and invokes the provider component according to a protocol that pairs the provider component with a defined configuration to use when invoking the provider component;
        identifying, by the data contract, a provider component in response to the invocation by the data consumer component;
        invoking, by the data contract, the provider component;
        translating, by the provider component, input data from the data consumer to construct a producer request;
        sending, by the provider component, the producer request to a data producer component;
        sending, by the data producer component, output data to the provider component in response to the producer request;
        translating, by the provider component, the output data;
        sending, by the provider component, the translated output data to the data contract; and
        sending, by the data contract, the translated output data to the data consumer component.

2. The method of claim 1, wherein the data consumer component invokes the data contract by sending input data to the data contract according to an input schema defined in the data contract.

3. The method of claim 2, wherein the input schema is a local schema.

4. The method of claim 2, wherein the input schema is a remote schema.

5. The method of claim 1, wherein the data producer component fulfills the data contract in a manner selected by the data producer component without need for reference to the data consumer component.

6. The method of claim 1, wherein the provider component translates the output data according to an output schema defined in the data contract.

7. The method of claim 6, wherein the output schema is a local schema.

8. The method of claim 6, wherein the output schema is a remote schema.

9. A system for facilitating communication between a plurality of application components, the system comprising:
    a storage device configured to store program instructions; and
    one or more processors operably connected to the storage device and configured to execute the program instructions to cause the system to:
        invoke, by a data consumer component, a data contract by requesting data, wherein the data contract specifies communication parameters between application components and wherein the data contract identifies and invokes the provider component according to a protocol that pairs the provider component with a defined configuration to use when invoking the provider component;
        identify, by the data contract, a provider component in response to the invocation by the data consumer component;
        invoke, by the data contract, the provider component;
        translate, by the provider component, input data from the data consumer to construct a producer request;
        send, by the provider component, the producer request to a data producer component;
        send, by the data producer component, output data to the provider component in response to the producer request;
        translate, by the provider component, the output data;
        send, by the provider component, the translated output data to the data contract; and
        send, by the data contract, the translated output data to the data consumer component.

10. The system of claim 9, wherein the data consumer component invokes the data contract by sending input data to the data contract according to an input schema defined in the data contract.

11. The system of claim 10, wherein the input schema is a local schema.

12. The system of claim 10, wherein the input schema is a remote schema.

13. The system of claim 9, wherein the application components are Label Distribution Protocol components.

14. The system of claim 9, wherein the data producer component fulfills the data contract in a manner selected by the data producer component without need for reference to the data consumer component.

15. The system of claim 14, wherein the output schema is a local schema.

16. The system of claim 14, wherein the output schema is a remote schema.

17. A computer program product for facilitating communication between application components, the computer program product comprising:
- a computer-readable storage medium having program instructions embodied thereon to perform the steps of:
- invoking, by a data consumer component, a data contract by requesting data, wherein the data contract specifies communication parameters between application components and wherein the data contract include an input schema for the data consumer component to invoke the data contract according to a protocol that pairs the provider component with a defined configuration to use when invoking the provider component, and an output schema for the provider component to translate the output data;
- identifying, by the data contract, a provider component in response to the invocation by the data consumer component;
- invoking, by the data contract, the provider component;
- translating, by the provider component, input data from the data consumer to construct a producer request;
- sending, by the provider component, the producer request to a data producer component;
- sending, by the data producer component, output data to the provider component in response to the producer request;
- translating, by the provider component, the output data;
- sending, by the provider component, the translated output data to the data contract; and
- sending, by the data contract, the translated output data to the data consumer component.

* * * * *